H. H. PATRICK.
METHOD OF MAKING HOLLOW PISTONS.
APPLICATION FILED MAY 6, 1912.

1,061,922.

Patented May 13, 1913.

WITNESSES
Sidney Brooks
J. P. Davis

INVENTOR
Hubert Harry Patrick
BY Munn & Co
ATTORNEYS

UNITED STATES PATENT OFFICE.

HUBERT HARRY PATRICK, OF HANDSWORTH, BIRMINGHAM, ENGLAND, ASSIGNOR TO THE OXYGEN WELDING WORKS LIMITED, OF BIRMINGHAM, ENGLAND.

METHOD OF MAKING HOLLOW PISTONS.

1,061,922.  Specification of Letters Patent.  Patented May 13, 1913.

Application filed May 6, 1912.  Serial No. 695,261.

*To all whom it may concern:*

Be it known that I, HUBERT HARRY PATRICK, subject of the King of Great Britain, residing at 50 Sandwell road, Handsworth, in the city of Birmingham, England, engineer, have invented certain new and useful Improvements Relating to Methods of Making Hollow Pistons, of which the following is a specification.

This invention relates to pistons employed, more especially, in internal combustion engines for motor road vehicles and the like, and has for its object to construct an improved piston which reduces the inertia effects and the wear experienced with ordinary pistons, is cheaper to construct, and is capable of being very conveniently case-hardened.

The invention comprises the construction of the piston from steel tube having a closing plate and gudgeon pin bearing bosses autogenously, electrically or similarly welded thereon.

The invention further comprises the formation of the grooves in the piston for the piston rings by rolling or equivalent operations.

Figure 1:
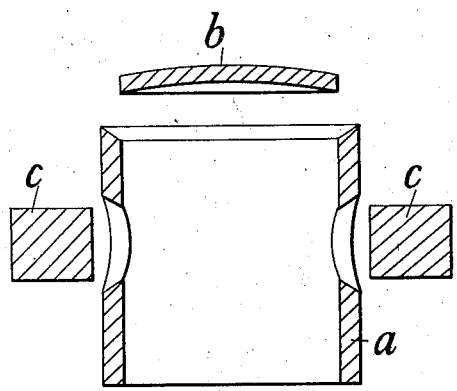
Figure 2:
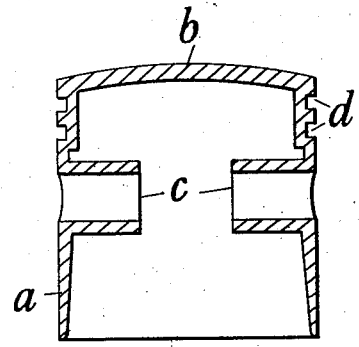
Figure 3:
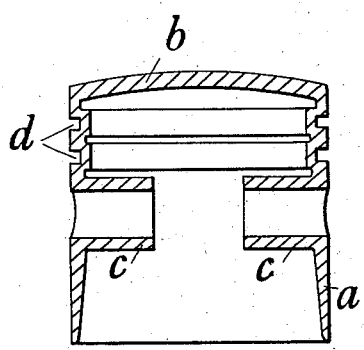
Figure 4:
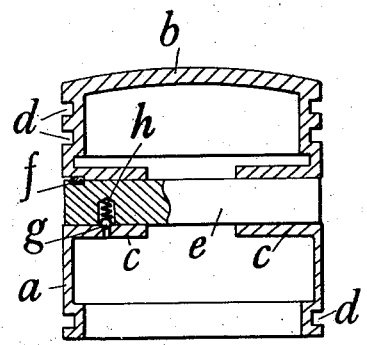

In the accompanying sheet of explanatory drawings:—Figure 1 is a sectional view illustrating the elements from which my improved pistons are constructed, and Fig. 2 is a similar view of a finished piston. Figs. 3 and 4 are sections of modified forms of my pistons.

The same reference letters in the different views indicate the same parts.

In the construction of a piston for a motor vehicle engine as shown in Figs. 1 and 2, the body *a* of the piston is formed from a portion of weldless steel tube. On one end is welded a cover *b* which may take the form of either a flat or a dished plate. The adjacent edges of the plate and body may be chamfered as shown. About mid-way between the ends the body of the piston is drilled with a pair of diametrically opposite apertures into which short solid or tubular portions *c* are inserted to serve as the bearings or bosses for the gudgeon pin. The cover and the bosses are secured in position by autogenous, electrical or similar welding. When solid portions *c* are employed these are subsequently drilled as shown to receive the gudgeon pin. At the parts where welding is to be effected it is preferable to shape the parts so that a groove or recess is provided for the reception of the metal by which the parts are united. In Fig. 1 the groove at the top of the piston is made by chamfering the body and making the cover of slightly smaller diameter than the body. Around the bosses the grooves are formed by chamfering the holes in the body.

The grooves *d* for the reception of the piston rings may be formed in the tubular body before the application of the cover and the gudgeon pin bosses thereto by any suitable rolling or equivalent operation performed either in the cold or hot state. This method of producing the grooves is very advantageous in that it enables metal of uniform thickness to be provided in all parts of the piston and avoids the necessity for thickening adjacent to the grooves which occurs in pistons as ordinarily made. A piston thus grooved is shown in Fig. 3. In other respects the piston is similar to that shown in Figs. 1 and 2.

The complete piston is machined up in the ordinary way to the required size, and if desired its outer wearing surface may be case hardened in any convenient manner. In some forms the upper end is made thicker than the lower, and the piston rings in the upper end are cut, instead of being rolled, as above described. Such a form is shown in Fig. 2. In another form the skirt or lower end of the piston is provided with a thickened portion in which a groove is cut for the reception of a scraping or additional ring. This is shown in Fig. 4.

For securing the gudgeon pin as *e* in position a small key *f* is formed on one end of the pin, and a corresponding slot or recess is formed in the piston to receive the key. The gudgeon pin has also embedded in it a ball *g* or other catch or pawl which is pressed outward by means of a spring *h*, and an aperture is provided in one of the bearing bosses into which the ball can partially enter. When the gudgeon pin is inserted in position the ball automatically springs into the said aperture and effectively secures the pin against endwise movement. To withdraw the pin it is necessary first to disengage the ball by pressing it into the pin against the spring action.

Having thus described my invention what

I claim as new and desire to secure by Letters Patent is:—

1. The method herein described of making hollow pistons with inwardly projecting bearing bosses, consisting in forming oppositely arranged openings in an open ended tubular body at about its center of length, securing bearing bosses in said openings to extend into the body, and securing a plate on one end of the said body.

2. The method herein described of making hollow pistons with inwardly projecting bearing bosses, consisting in forming oppositely arranged openings in an open ended tubular body at about its center of length, securing solid blocks in said openings to extend into the body, forming bores in said blocks whereby to form said blocks into hollow bearing bosses for the reception of a gudgeon pin, and securing a plate on one end of said body.

In testimony whereof I have signed my name to this specification in the presence of two subscribing witnesses.

HUBERT HARRY PATRICK.

Witnesses:
 JOHN MORGAN,
 FRANCIS MALPAS.